(12) United States Patent
Manders et al.

(10) Patent No.: US 6,957,851 B2
(45) Date of Patent: Oct. 25, 2005

(54) OPEN ROOF CONSTRUCTION FOR A VEHICLE, AND METHOD OF MOVING A CLOSURE ELEMENT THEREOF

(75) Inventors: Peter Christiaan Leonardus Johannes Manders, Horst (NL); Chris de Jong, Zwolle (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 10/426,009

(22) Filed: Apr. 29, 2003

(65) Prior Publication Data
US 2004/0007902 A1    Jan. 15, 2004

(30) Foreign Application Priority Data
May 3, 2002  (EP) .................................. 02077744

(51) Int. Cl.[7] ........................... B60J 7/057; B60J 7/047
(52) U.S. Cl. .................................. 296/223; 296/216.05
(58) Field of Search ..................... 296/216.03, 216.05, 296/223, 224

(56) References Cited

U.S. PATENT DOCUMENTS

| | | | |
|---|---|---|---|
| 4,893,869 A | 1/1990 | Fuerst | |
| 5,765,907 A | 6/1998 | Nabuurs | |
| 6,325,453 B1 * | 12/2001 | Manders | 296/223 |
| 6,343,833 B1 * | 2/2002 | Manders | 296/223 |
| 6,390,544 B1 * | 5/2002 | Manders et al. | 296/223 |
| 6,419,310 B1 * | 7/2002 | Manders | 296/223 |

FOREIGN PATENT DOCUMENTS

| | | |
|---|---|---|
| EP | 1 095 807 A1 | 5/2001 |
| WO | WO 00/06403 | 2/2000 |

\* cited by examiner

*Primary Examiner*—Dennis H. Pedder
(74) *Attorney, Agent, or Firm*—WEstman, Champlin & Kelly, P.A.; Todd R. Fronek

(57) ABSTRACT

An open roof construction for a vehicle comprises a stationary part for attachment to the roof. It has at least one stationary guide rail on a side of the roof opening. A closure element is supported by an operating mechanism and is adjustable between a closed position, in which it closes the roof opening, and an open position. The operating mechanism comprises a driving slide and a link plate attached to the closure element and having a first guide track with which a guide member is in engagement. A curve part on the stationary part includes a second guide track having a vertical component. The guide member is also in engagement with said second guide track, wherein the driving slide is adapted to drive the guide member at least along part of the path of movement of the closure element.

The driving slide has releasable first and second coupling members to couple and uncouple the driving slide with respect to the guide member and to the closure element, respectively, so as to either drive the guide member with respect to the first and second guide tracks and/or or to drive the closure element with respect to the guide member.

12 Claims, 9 Drawing Sheets

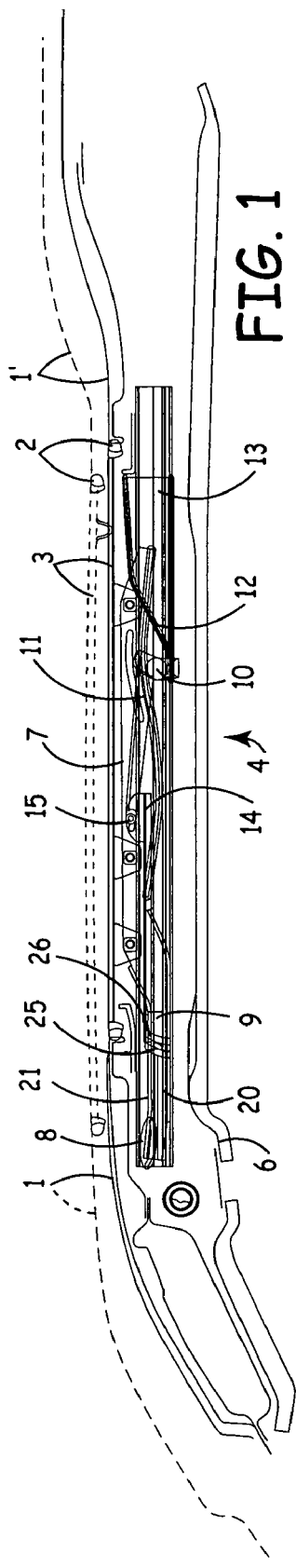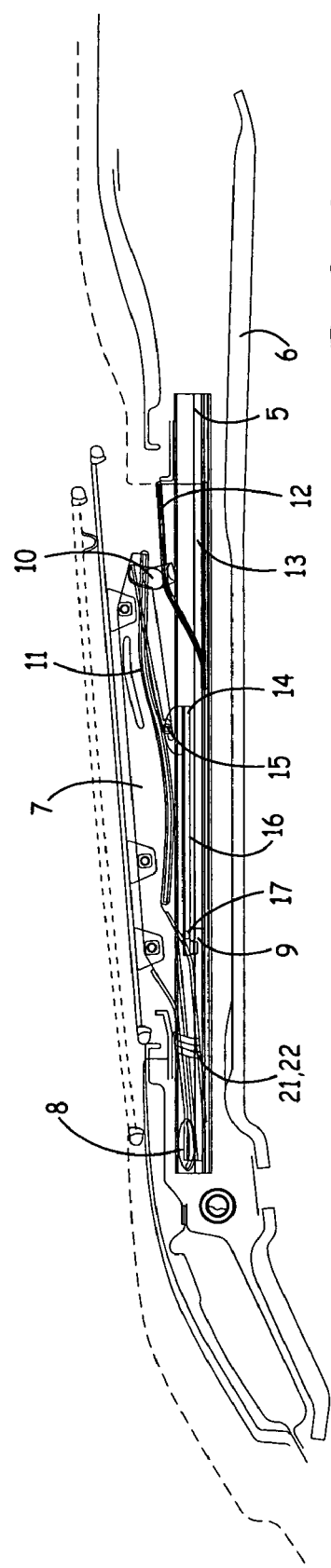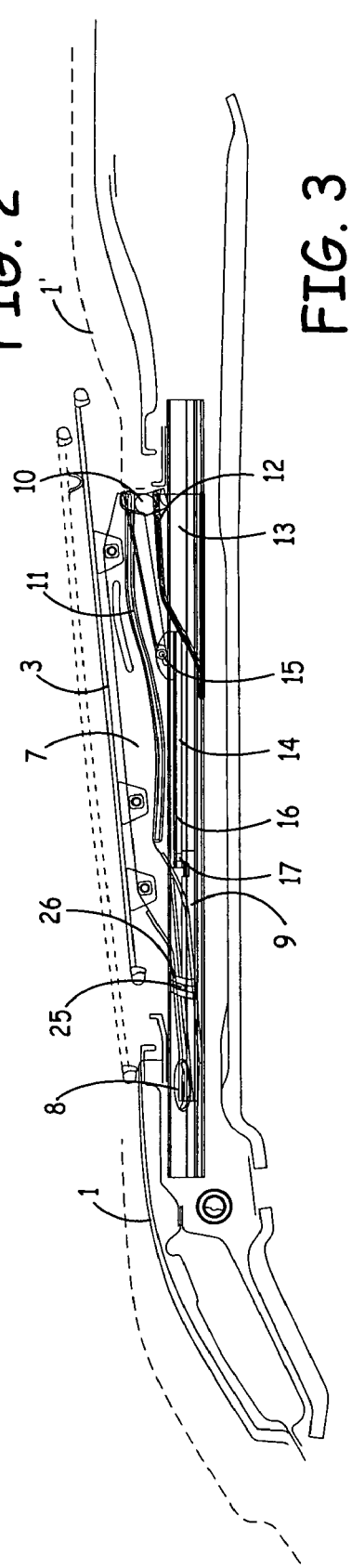

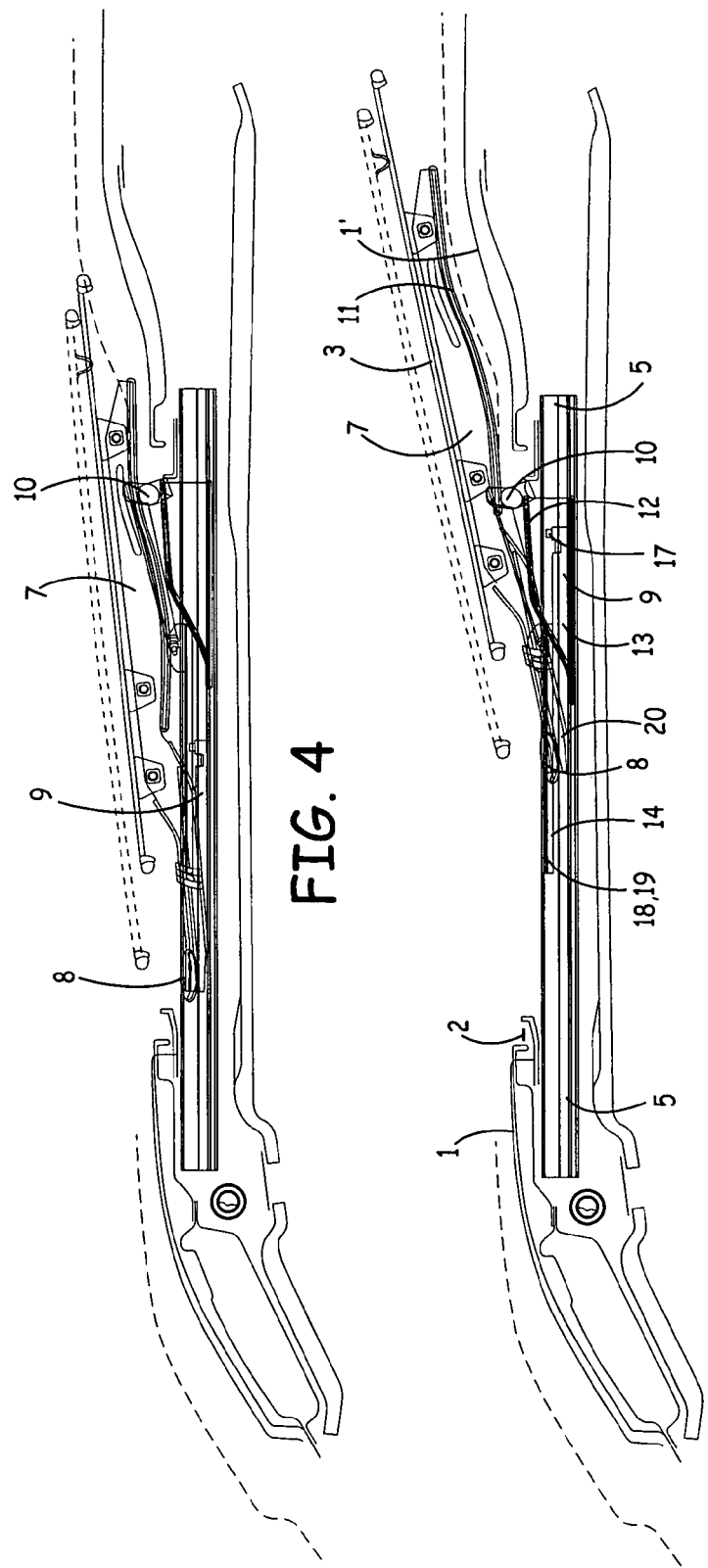

OPEN ROOF CONSTRUCTION FOR A VEHICLE, AND METHOD OF MOVING A CLOSURE ELEMENT THEREOF

BACKGROUND OF THE INVENTION

The present invention relates to an open roof construction for a vehicle, as well as to a method of moving a closure element in an open roof construction.

Such an open roof construction and method are known from WO-A-00/06403 of applicant. The open roof construction disclosed therein is a so called tilt-sliding roof.

SUMMARY OF THE INVENTION

The object of the present invention is to adapt the operating mechanism of the prior art in order to enable the closure element to perform other or additional movements.

An open roof construction for a vehicle comprises a stationary part for attachment to the roof. It has at least one stationary guide rail on a side of the roof opening. A closure element is supported by an operating mechanism and is adjustable between a closed position, in which it closes the roof opening, and an open position. The operating mechanism comprises a driving slide and a link plate attached to the closure element and having a first guide track with which a guide member is in engagement. A curve part on the stationary part includes a second guide track having a vertical component. The guide member is also in engagement with said second guide track, wherein the driving slide is adapted to drive the guide member at least along part of the path of movement of the closure element.

The driving slide has releasable first and second coupling members to couple and uncouple the driving slide with respect to the guide member and to the closure element, respectively, so as to either drive the guide member with respect to the first and second guide tracks and/or or to drive the closure element with respect to the guide member.

By having the driving slide coupled to either the guide member and/or to the closure element, it is possible to obtain a different way of operating the closure element.

This is particularly useful for open roof constructions of the spoiler type in which the closure element is moved from the closed position rearwardly above the fixed roof. In this embodiment, the curve part is substantially fixed to the stationary part, whereas the guide member has a locking element in order to lock it to the stationary part, substantially while the closure element is moved with respect to the guide member.

In this manner, the support of the closure element can be positioned to the rear of the roof opening. Then, the curve part with the second guide track is substantially stationary and may thus be positioned near the rear edge of the roof opening since it is not or substantially not moved in the rearward direction. The guide member may take a rear position on the curve part when the closure element is moved with respect to the guide member and the second guide track, thus maximizing the rearward position. It is also very easy to make the curve part and the guide member strong and rigid and minimise the flexural forces in the guide member, since there is no need for a set-out lever.

The mechanism for coupling and uncoupling the driving slide to and from the guide member and the closure element can be made reliable and robust so that a smooth operation can be obtained with a small number of parts. There is sufficient design freedom to obtain a controllable driving slide displacement for the different movements of the closure element.

BRIEF DESCRIPTION OF THE DRAWINGS

The invention will hereafter will be elucidated with reference to the drawings showing an embodiment of the open roof construction according to the invention.

FIGS. 1–5 are longitudinal sectional views of the open roof construction in four different positions thereof.

DETAILED DESCRIPTION OF THE PREFERRED EMBODIMENTS

Figure 6:
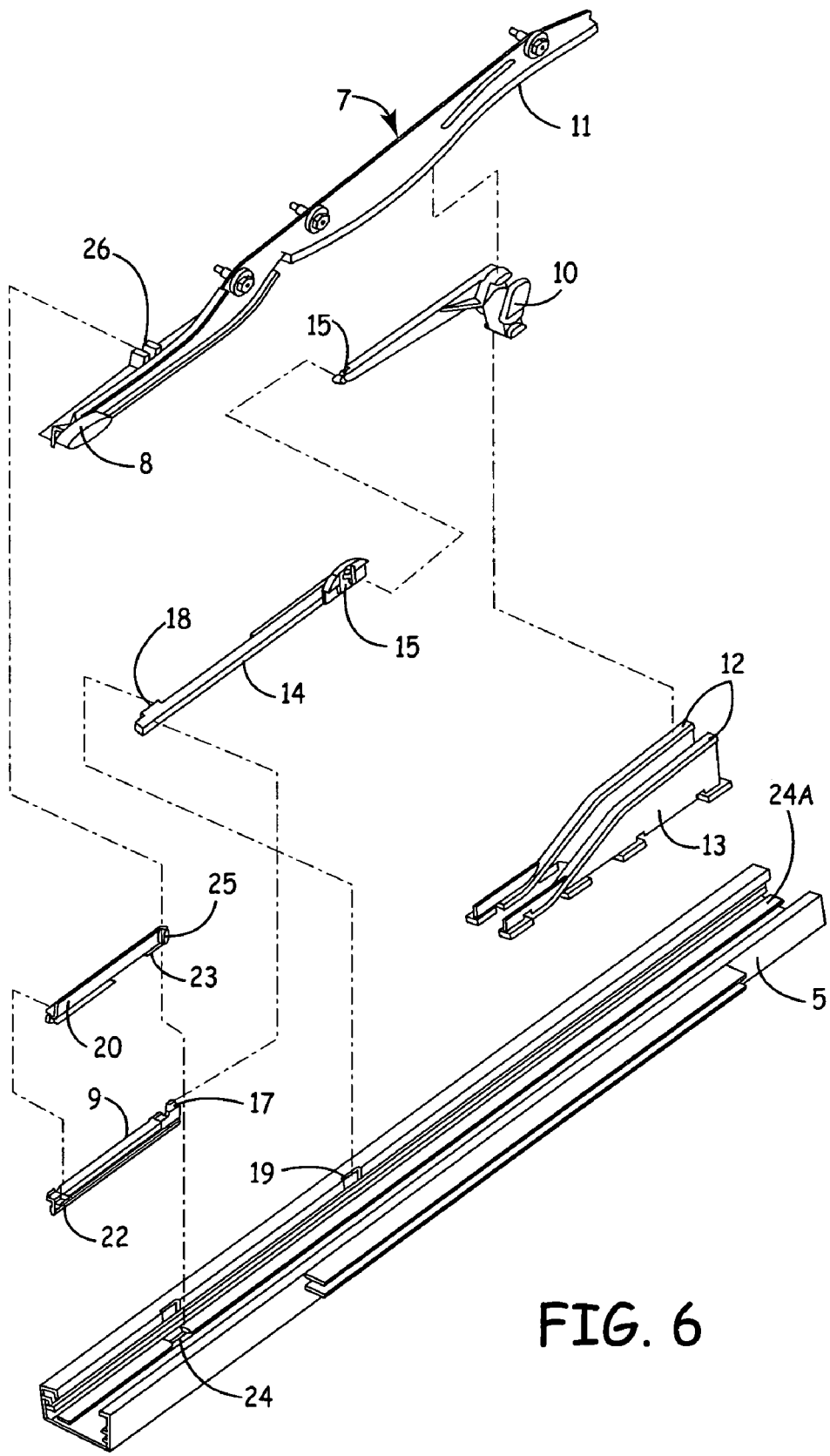
FIGS. 6 and 7 are perspective exploded views from two different angles showing the parts of the operating mechanism in the open roof construction of FIGS. 1–5 from two sides.
Figure 7:
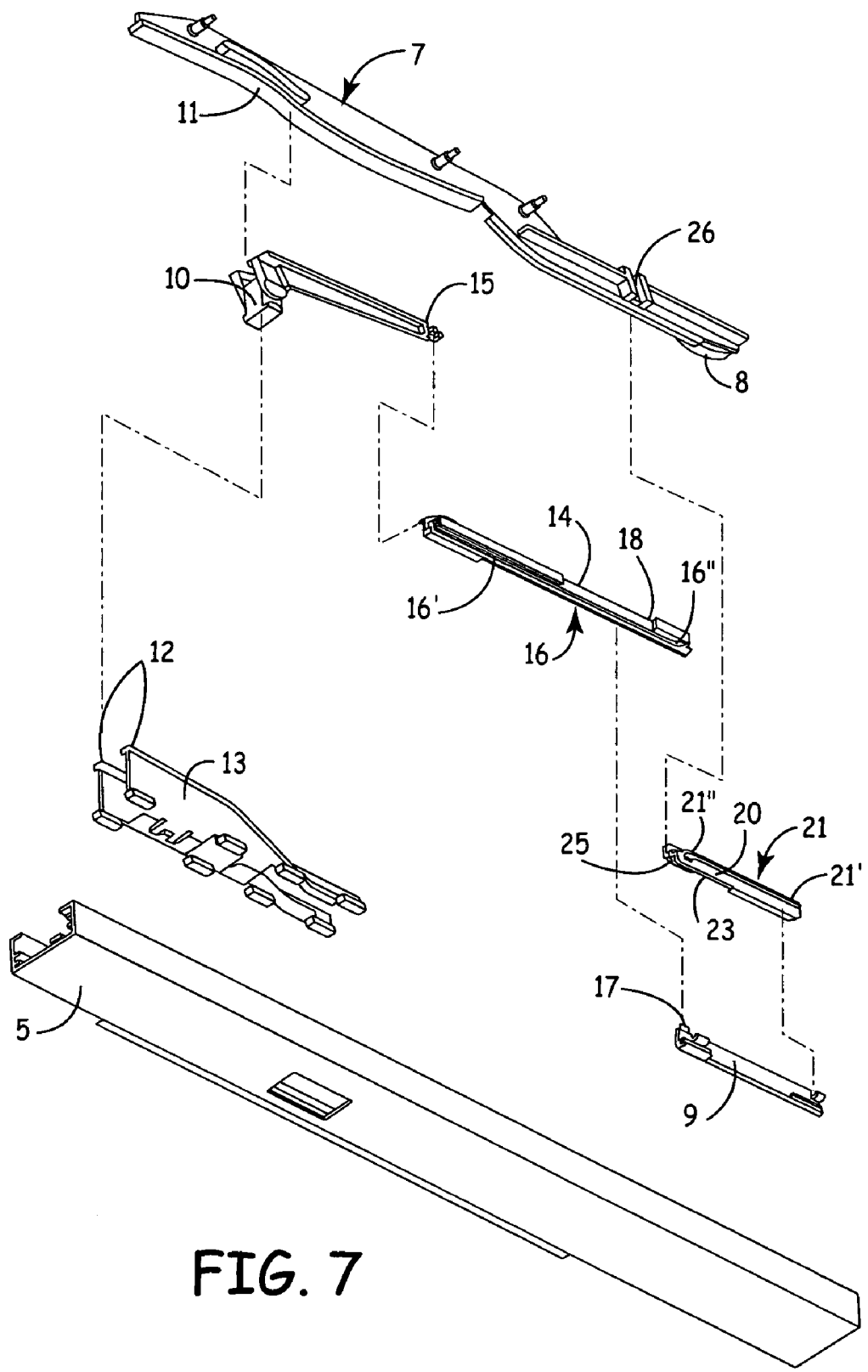
Figure 7A:
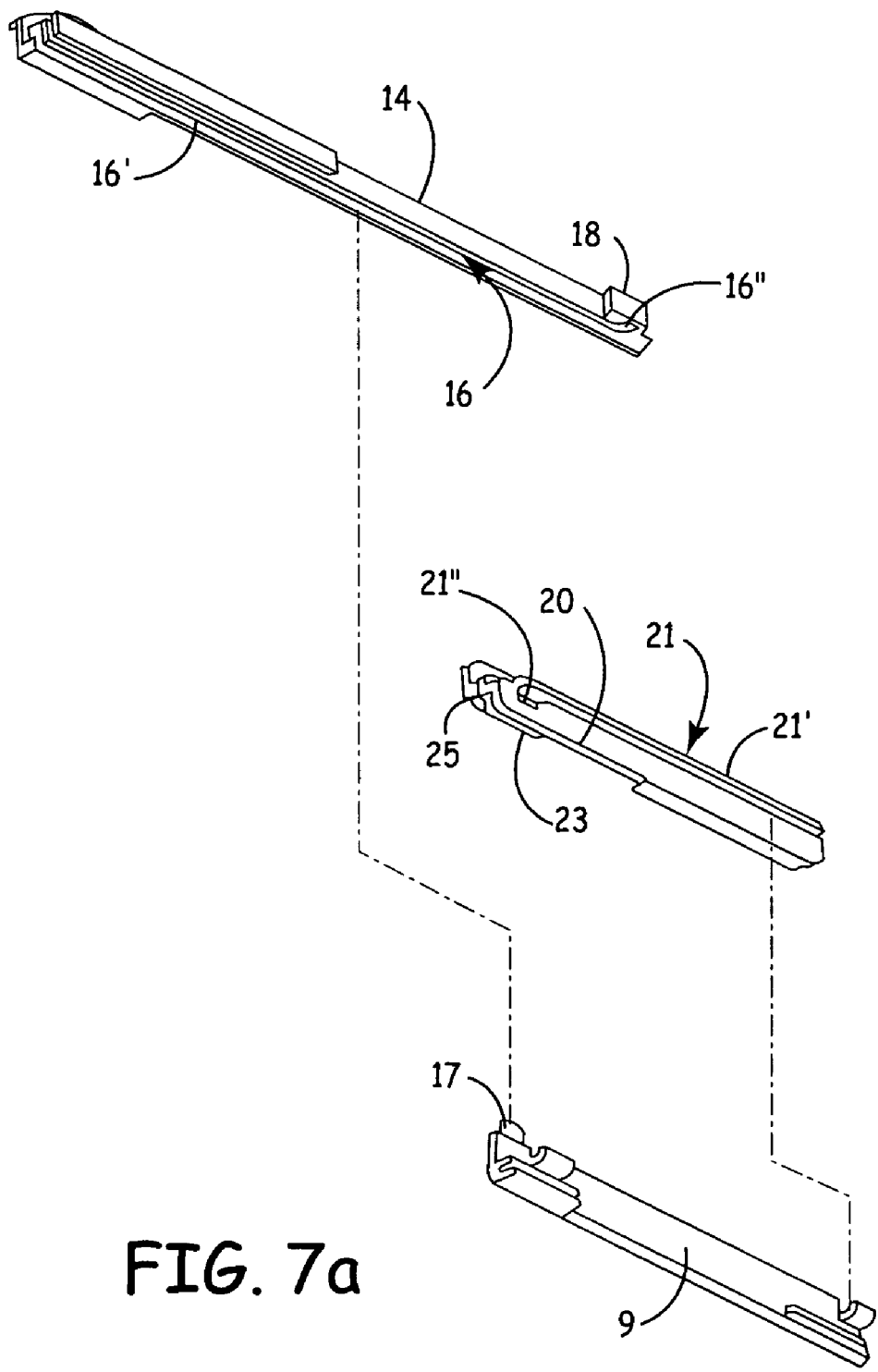
FIG. 7A is a perspective exploded view of parts shown in FIG. 7.

The drawings show an embodiment of an open roof construction for a vehicle which, in the embodiment as shown, is an MPV (multi purpose vehicle) having a fixed roof 1 including a raised rear portion 1'. In front of the raised rear portion 1', there is provided a roof opening 2 in the fixed roof 1. The fixed roof 1 of the vehicle may form part of the vehicle, but may also form part of the open roof construction assembly which is built in the vehicle as a complete roof. The dashed lines in FIGS. 1–5 illustrate the contours of a different vehicle having a different fixed roof 1 and a different roof opening 2, but using the same operating mechanism for the open roof construction.

The open roof construction comprises a closure element, here in the form of a rigid, preferably a mainly transparent glass or plastic panel 3. The closure element could also be constructed differently, or the open roof construction may include several closure elements.

The open roof construction is of the so-called spoiler type which means that the panel 3 is movable from a closed position in the roof opening (FIG. 1), preferably flush with the fixed roof 1, to a rearwardly displaced position above the roof portion 1' behind the roof opening 2 (FIG. 5). In the embodiment shown, the panel 3 can first be moved to a venting position in which the rear edge of the panel 3 is mainly tilted and the panel 3 is kept substantially stationary in longitudinal direction of the vehicle (FIG. 2). After this tilting to the venting position according to FIG. 2, the panel is displaced rearwardly, first to the positions of FIGS. 3 and 4 and then to the end position of FIG. 5. From this position, the panel 3 may be moved in opposite direction to the closed position of FIG. 1 again.

In order to enable the panel 3 to perform the movements as described above, it is supported by an operating mechanism 4, preferably on each longitudinal side of the roof opening 2. The drawings show one operating mechanism 4, but in the embodiment shown there is another operating mechanism on the other side of the roof opening 2, the parts of which will generally be a mirror image of the parts as shown.

The operating mechanism 4 is mounted in a stationary guide rail 5 which forms part of, or is mounted to a stationary part of the open roof construction, generally a frame 6 which is mounted to the fixed roof 1 of the vehicle.

The operating mechanism 4 includes a link plate 7 mounted to the panel 3 along the longitudinal side edge thereof. The link plate 7 has a front guide shoe 8 with which the front of the panel 3 is slidably guided in a groove of the stationary guide rail 5 and which front guide shoe, in the embodiment shown, also functions as a front pivot of the panel 3 about which the link plate 7 may be pivoted. It would also be possible to have the sliding and the pivoting functions separated.

The operating mechanism 4 is driven and actuated by means of a driving slide 9 which is guided in the stationary guide rail 5 and which is controlled by a driving means such as an electric motor or a hand crank which is connected to the driving slide 9, for example through a push and pull cable (not shown).

The operating mechanism 4 also includes a rear support for the panel 3 positioned a (variable) distance behind the front guide shoe 8 and constructed as a guide member 10 which may be driven during at least a part of the movement of the panel 3 by the driving slide 9. The guide member 10 is slidably in engagement which the link plate 7 of the panel 3 through a first guide track 11, in this case formed by two laterally projecting ribs extending in opposite directions, i.e. away from each other. The guide member 10 is also slidably in engagement with a second guide track 12 formed on a curve plate 13 which is stationary with respect to the guide rail 5 and can be fixed thereto. The second guide track 12 is also formed by two laterally extending ribs which, however, extend towards each other.

As is shown in the drawings, both guide tracks 11, 12 extend in a curve, or at least have a component in a direction perpendicularly to the longitudinal guide rail 5. The first guide track 11 on the link plate 7 is substantially longer than a second guide track 12 and the function thereof will be explained later on.

As mentioned before, the guide member 10 is drivable by means of the driving slide 9, in this case only during part of the movements of the panel 3, so that the guide member 10 and the driving slide 9 are not permanently connected but are connected through a coupling member in order to couple and uncouple the driving slide 9 to and from the guide member 10. For this purpose the guide member 10 has a guide member slide 14 which is slidably guided in the stationary guide rail 5 and to which the guide member 10 is pivotally connected through a pivot 15. The guide member slide 14 includes a slot 16 in which a cam 17 on the driving slide 9 may engage. The slot 16 has a long lost motion portion 16' allowing the cam 17 of the driving slide 9 to move and thereby allowing the driving slide 9 to move with respect to the guide member 10. The slot 16 has also a locking portion 16" extending at an angle to the direction of the guide rail 5, so that, when the end of the guide member slide 14 including the locking portion 16" of the slot 16 is locked against a movement in a lateral direction, the cam 17 of the driving slide 9 is locked in said locking portion 16" and thus the driving slide 9 and the guide member slide 14 form a unit in order to displace the guide member 10.

The portion of the guide member slide 14 containing the locking portion 16" is locked against movement in the lateral direction as long as a locking cam 18 in-line with the locking portion 16" is not engaged in a recess 19 in the stationary guide rail 5. As soon as the locking cam 18 is positioned laterally in-line with the locking recess 19, it is allowed to move in the lateral direction allowing the cam 17 to leave the locking portion 16" and enter the lost motion portion 16' of the slot 16. In this way, the guide member slide 14 and thereby the guide member 10 is locked with respect to the stationary guide rail 5 and the driving slide 9 is allowed to move with respect to the guide member 10 which is kept substantially stationary.

When or just before the driving slide 9 is uncoupled from the guide member 10 it is allowed to be coupled to the panel 3 in order to slide the panel 3 and allow the first guide track 11 of the panel 3 to move with respect to the guide member 10.

To couple the driving slide 9 to the panel 3 there is provided a link plate slide 20 which is connected to the link plate 7 of the panel in a manner to be described and which is adapted to be coupled and uncoupled to and from the driving slide 9. For this purpose, the link plate slide 20 comprises a slot 21 including a lost motion portion 21' and a locking portion 21". The driving slide 9 includes a cam 22 adapted to slide in the lost motion portion 21' and adapted to be locked in the locking portion 21" of slot 21 in the link plate slide 20. The cam 22 of the driving slide 9 will be locked in the locking portion 21" of the link plate slide 20 as long as a locking tab 23, which is positioned in the vicinity of the locking portion 21" of the slot 21, is not in engagement with a locking recess 24 in the stationary guide rail 5. If the locking tab 23 is allowed to enter the locking recess 24, the locking portion 21" is no longer locked against a height movement in the stationary guide rail 5 thereby allowing the cam 22 of the driving slide 9 to leave the locking portion 21" of the slot 21 and to enter the lost motion portion 21'. Thus, the link plate slide 20 is locked with respect to the stationary guide rail 5 and is uncoupled from the driving slide 9.

As mentioned before, the link plate slide 20 is connected in a special manner to the link plate 7, that is through a panel front connection mechanism including a laterally extending cam 25 and a short groove 26 in the link plate 7 which has an extent that deviates from a circle around the pivot axis of the link plate 6. This means that during a pivoting movement of the link plate 7 and therefore the panel 3 during the tilting phase, the groove 26 is moved with respect to the stationary cam 25 (the link plate slide 20 is locked when the panel 3 is tilted). The panel 3 is then displaced slightly in a longitudinal direction of the stationary guide rail 5 in order to move the front edge of the panel 3 away from the front edge of the roof opening 2 to prevent damage to a seal which is present between the front side of the panel 3 and the edge of the roof opening 2.

The operation of the operating mechanism 4 will now be described with reference to FIGS. 1–5 and FIGS. 8–11.

Figure 8A:
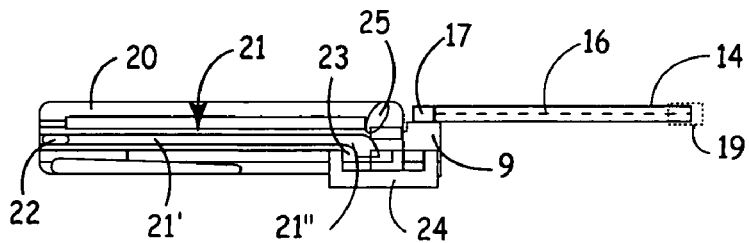
FIGS. 8a–d are views corresponding to those of FIGS. 1–5, but showing only two parts of the operating mechanism in an isolated manner and on an enlarged scale.
Figure 9A:
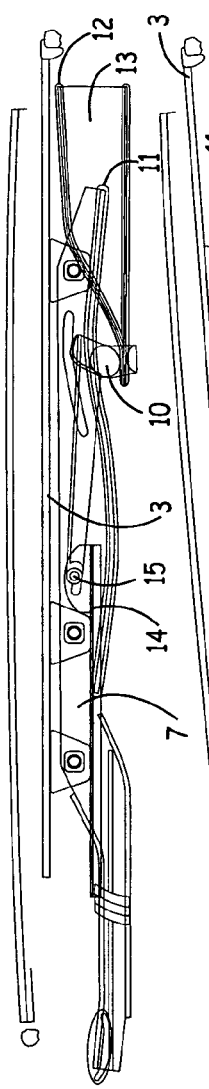
FIGS. 9a–e are views corresponding to those of FIGS. 8a–d, but showing different parts of the operating mechanism on a different scale.
Figure 9B:
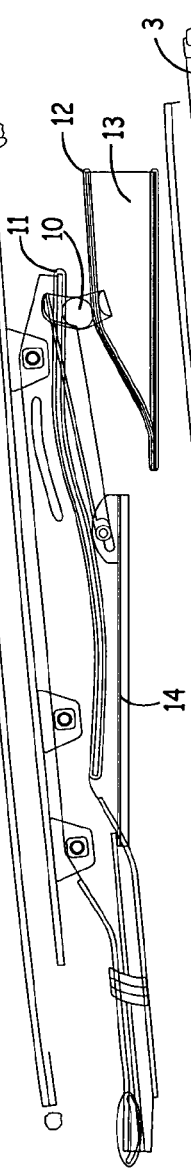
Figure 9C:
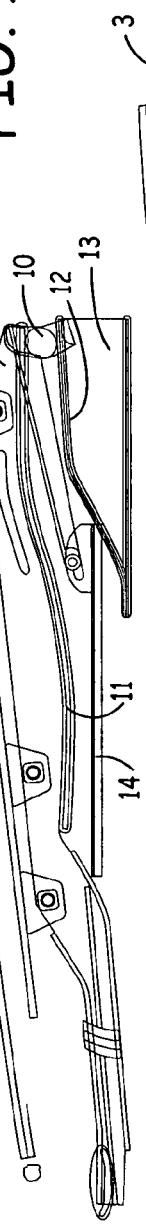
Figure 10A:
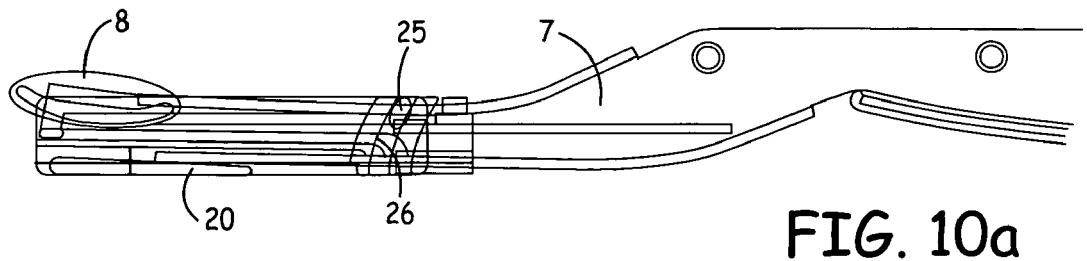
FIGS. 10a–d are views corresponding to that of FIGS. 8a–d, but showing still other parts of the operating mechanism on a different scale.

In FIG. 1 the panel 3 is in the closed position. The driving slide 9 is in its front position. The cam 17 of the driving slide 9 is locked in the locking portion 16" of the guide member slide 14, whereas the other cam 22 is positioned at the end of the lost motion portion 21' of the slot 25 remote from the locking portion 21" (FIG. 8a). The cam 25 of the front correction mechanism is positioned at the upper end of the groove 26 in the link plate 7 (FIG. 10a). The guide member 10 is in engagement with both guide tracks 11 and 12, that is at the forward end of the second guide track and in a position between the ends of the first guide track 11 (FIG. 9*a*).

In the position of FIG. 2, the driving slide 9 is moved a distance rearwardly and the panel 3 is pivoted to the venting position in which the rear edge of the panel 3 is lifted. The guide member slide 14 is displaced as a unit together with the driving slide 9 thereby urging the guide member 10 to slide along the first and second guide tracks 11, 12 (FIG. 9*b*), with respect to guide rail 5 (cf. FIGS. 11*a*–11*b*). Depending on the shape and direction of the guide tracks 11, 12 the rear side of the panel 3 will be lifted by the guide member 10, especially when it is moved along a first portion of the first guide track 11 which extends under a larger angle with respect to the stationary guide rail 5 than a second portion. The guide member 10 is allowed to pivot with respect to the guide member slide 14 in order to allow the guide member 10 to move in a vertical direction.

Figure 10B:
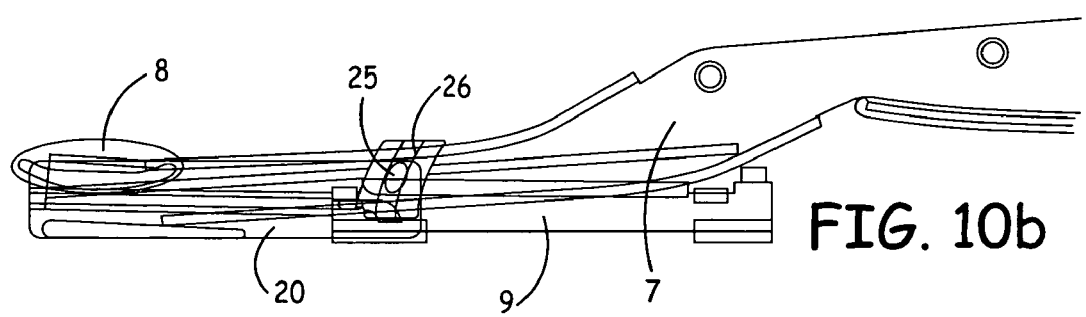
Figure 10C:
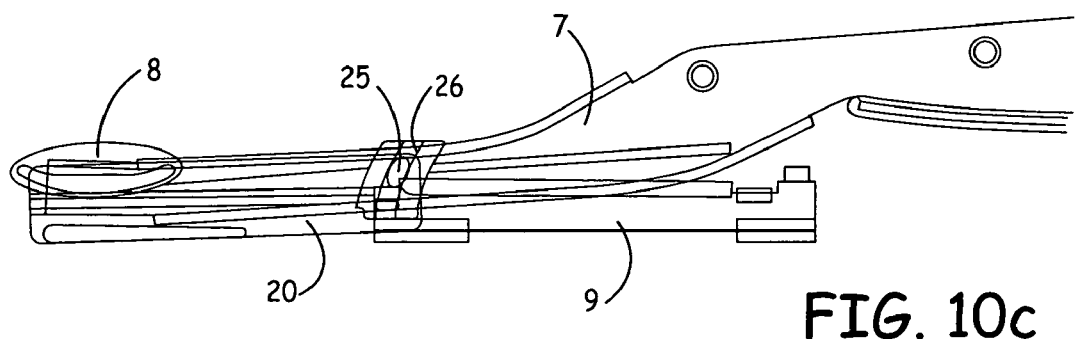
Figure 10D:
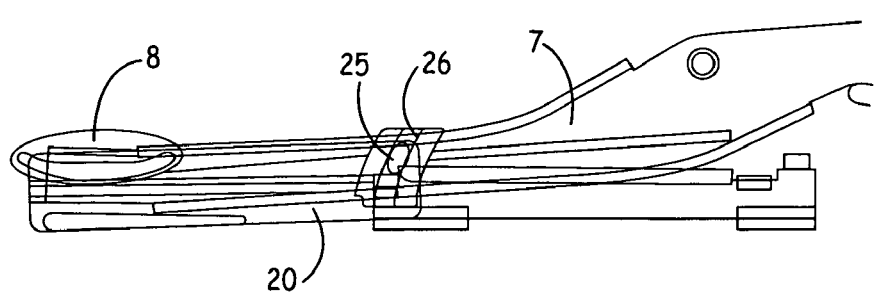

Since the cam 25 of the link plate slide 20 is stationary, the groove 26 is moved with respect to the cam 25 as a result of the pivoting movement of the link plate 7 (FIG. 10*b*). As the groove 26 inclines rearwardly and upwardly the link plate 7 has to be displaced slightly rearwardly in order to allow the groove 26 to follow the cam 25. The front side of the panel 3 is hence moved away from the front edge of the roof opening 2.

Figure 8B:
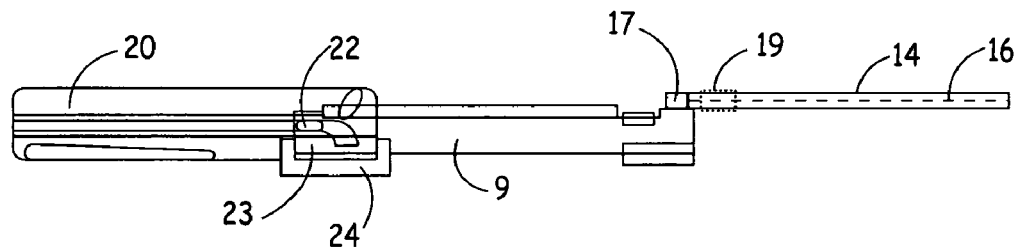

The cam 22 of the driving slide 9 has been displaced through the lost motion portion 21' of the link plate slide 20 and has come in the vicinity of the locking portion 21" (FIG. 8*b*).

Figure 8C:
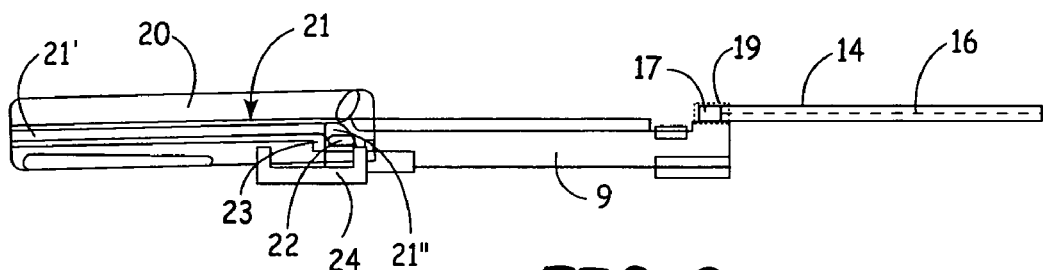
Figure 8D:
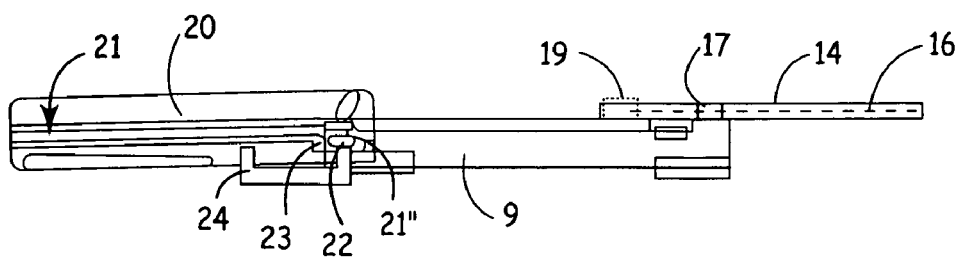

In the position of FIG. 3, the cam 22 of the driving slide 9 has entered the locking portion 21" and has moved the rear end of the link plate slide 20 upwardly in order to lift the locking tab 23 of the link plate slide 20 out of the locking recess 24 (FIG. 8*c*). During a part of the displacement of the driving slide 9 between the positions of FIGS. 2 and 3 the displacement of the driving slide S has caused the cam 22 to pull the link plate slide 20 rearwardly and move as a unit with the driving slide 9. The cam 22 cannot leave the locking portion 21" because the locking tab 23 engages a flange 24A of the stationary guide rail 5 (not shown) as long as it is moved away from the locking recess 24.

Figure 11A:
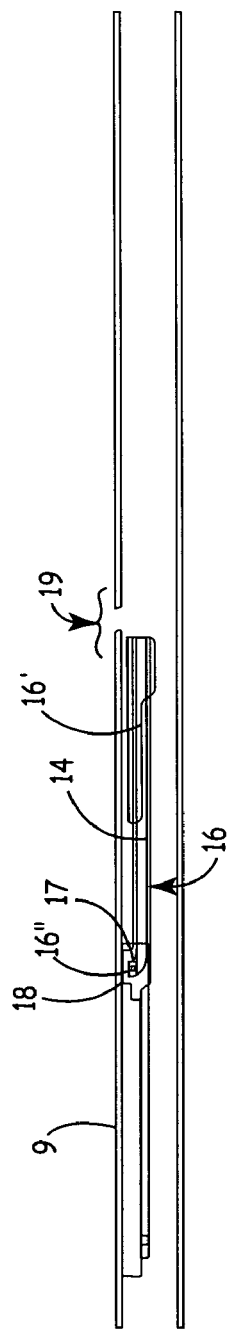
FIGS. 11a–11c are views corresponding to that of FIGS. 3–5, but showing a limited number of parts of the operating mechanism in an isolated manner.
Figure 11B:
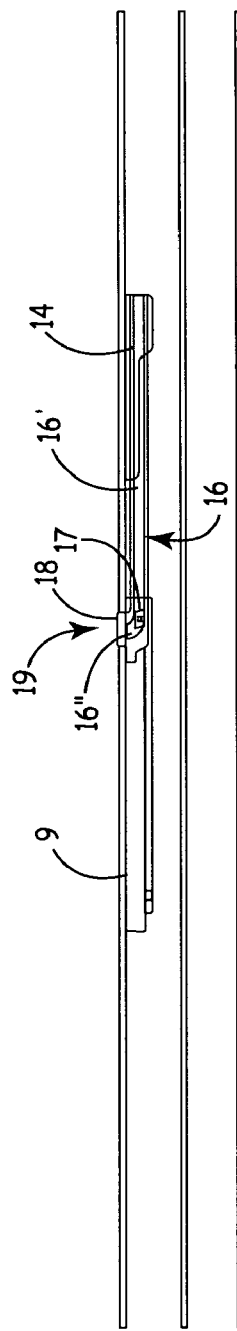
Figure 11C:
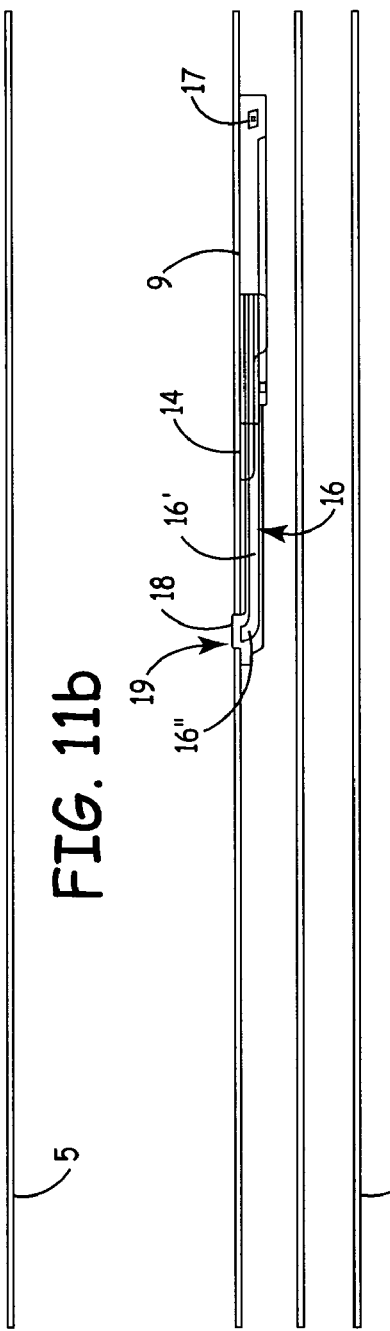

Between the positions of FIGS. 2 and 3, the driving slide 9 is coupled to both the link plate slide 20 and to the guide member slide 14. In FIGS. 3 and 11*b*, the locking cam 18 in the guide member slide 14 has arrived at the locking recess 19 in the stationary guide rail 5 allowing the locking cam 18 to move laterally and allowing the cam 17 in the driving slide 9 to leave the locking portion 16" of slot 16 in the guide member slide 14. Then the guide member slide 14 and the guide member 10 are locked in position and the driving slide 9 is allowed to move with respect to the stationary guide member slide 14 due to the displacement of cam 17 through the lost motion portion 16' in slot 16, as is shown in FIG. 11*c*. Since, during the movement of the driving slide from the position of FIG. 2 to the position of FIG. 3, the driving slide 9 is coupled to both the link plate slide 20 and to the guide member slide 14 there is in overlap in the coupling and uncoupling of the driving slide 9 to the other slides 14, 20 (cf. FIGS. 9*c* and 9*b*).

Figure 9D:
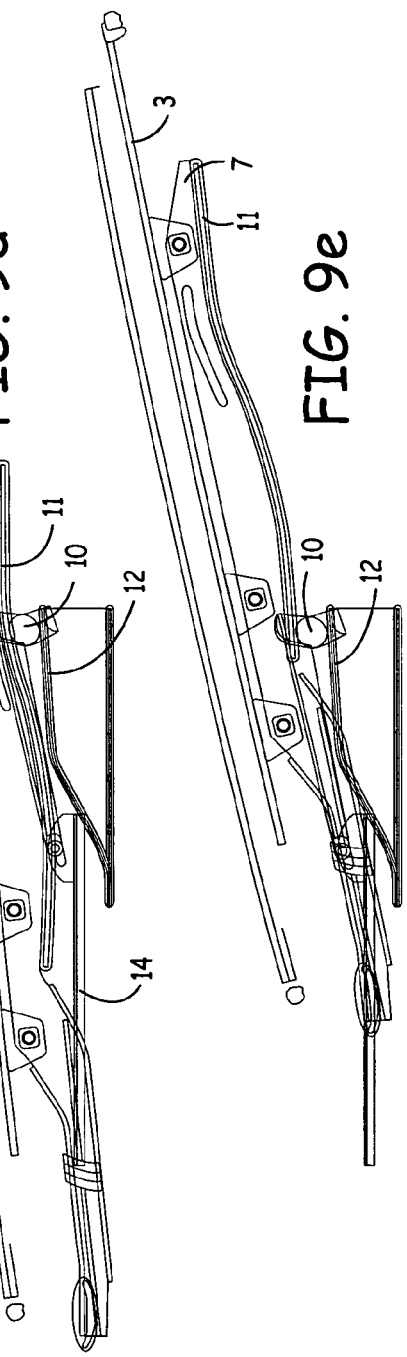

In the position of FIGS. 4 and 11*c*, the driving slide 9 and the link plate slide 20 have moved as a unit and the guide member slide 14 has been locked with respect to the stationary guide rail 5, wherein cam 18 engages recess 19. As a result, the link plate 7 and the first guide track 11 slide with respect to the guide member 10 so that the panel 3 is slid rearwardly and is possibly also moved in a vertical direction depending on the curvature of the first guide track 11 (FIG. 9*d*). The curvature of the guide track 11 will be chosen so as to obtain the desired panel movement, in this case there is the raised portion 1' of the fixed roof 1 necessitating a further upward movement of the rear edge of the panel 3. In FIG. 4 the first guide track 11 and the guide member 10 are again in the same relative position as in the closed position of the panel 3 according to FIG. 1.

Figure 9E:

From there the driving slide 9 and therefore the link plate 7 are moved further rearwardly to the fully opened position according to FIGS. 5, 9*e* and 11*c*. The guide member 10 then slides relatively along a forwardly extended part of the first guide track 11, and in the open position, the guide member 10 has arrived at the front end thereof. The curvature of the first guide track has caused the panel to tilt in a required fashion during the rearward sliding movement thereof. Closing of the panel 3 is effected by displacing the driving slide 9 in the forward direction again. The different movements as described before are performed in opposite direction and in the reversed order.

From the foregoing it will be clear that the invention provides a very stable support for panel 3 and allows a desired movement of the panel 3 through controllable driving slide displacements. The support of the panel 3 in the vertical direction is very strong due to the in-line support of the guide member. The rear support of the panel is spaced a large distance from the front support of the panel 3 to further enhance stability. With a small number of parts there is also obtained a panel front correction.

The invention is not limited to the embodiment shown in the drawing and described during before which may be varied in different manners within the scope of the appended claims.

What is claimed is:

1. An open roof construction for a vehicle having an opening in the fixed roof, comprising:
    a stationary part for attachment to the roof, having at least one stationary guide rail on a side of the roof opening; and
    a closure element supported by an operating mechanism, which is adjustable between a closed position, in which it closes the roof opening, and an open position, wherein the operating mechanism comprises:
    a driving slide, slidably guided in the guide rail;
    a link plate attached to the closure element and having a first guide track with which a guide member is in engagement; and
    a curve part on the stationary part including a second guide track having a vertical component, the guide member being also in engagement with said second guide track, wherein the driving slide can drive the guide member at least along part of the path of movement of the closure element, and wherein the driving slide has releasable first and second coupling members to couple and uncouple the driving slide with respect to the guide member and to the closure element, respectively, so as to either drive the guide member with respect to the first and second guide tracks and/or to drive the closure element with respect to the guide member.

2. The open roof construction according to claim 1, wherein the open roof construction is of the spoiler type in which the closure element can move from the closed position rearwardly above the fixed roof, and wherein the curve part is fixed to the stationary part, the guide member having a locking element in order to lock it to the stationary part, while the closure element is moved with respect to the guide member.

3. The open roof construction according to claim 1, wherein the second coupling member is a lost motion mechanism including a cam and a slot which are connected to the driving slide and the closure element, respectively, and which are movable with respect to each other during a lost motion phase when the guide member is driven, and which are locked during a driving phase when the closure element is moved with respect to the guide member and second guide track.

4. The open roof construction according to claim 3, wherein the slot has a long lost motion portion extending substantially parallel to the stationary guide rail and a short locking portion inclined with respect to the guide rail, such that the relative movement between the cam and the locking portion of the slot causes movement of the second coupling member to a coupling position in which the driving slide and the closure element are coupled.

5. The open roof construction according to claim 4, wherein the closure element is provided with a front guide shoe which is guided in the guide rail, the driving slide being coupled to the link plate of the closure element via a link plate slide of the second coupling member, wherein the link plate slide is provided with a locking element to lock the front guide shoe substantially with respect to the stationary guide rail during the lost motion phase, said locking element being locked and unlocked through said locking slot portion of the lost motion mechanism.

6. The open roof construction according to claim 5, wherein the link plate slide and the link plate of the closure element are connected to each other through a front correction mechanism adapted to cause a movement of the closure element parallel to the stationary guide rail upon a tilting movement of the closure element.

7. The open roof construction according to claim 6, wherein the front correction mechanism comprises a cam engaging an inclined groove.

8. The open roof construction according to claim 7, wherein the guide member includes a guide member slide which is movably connected to the guide member, and the first coupling member is between the driving slide and the guide member slide.

9. The open roof construction according to claim 8, wherein the guide member slide and the stationary guide rail comprise a guide member locking mechanism which is actuated substantially simultaneously with the first coupling member.

10. The open roof construction according to claim 9, wherein the guide member locking mechanism includes a locking recess in the stationary guide rail and a locking cam on the guide member slide, which is moveable into and out of the recess.

11. The open roof construction according to claim 1, wherein the first guide track is substantially longer than the second guide track.

12. A method of moving a closure element of an open roof construction for a vehicle having an opening in the fixed roof, comprising:

providing a stationary part for attachment to the roof, having at least one stationary guide rail on a side of the roof opening, a closure element supported by an operating mechanism, which is adjustable between a closed position, in which it closes the roof opening, and an open position, wherein the operating mechanism comprises a driving slide, slidably guided in the guide rail, a link plate attached to the closure element and having a first guide track with which a guide member is in engagement, and a curve part on the stationary part including a second guide track having a vertical component, the guide member being also in engagement with said second guide track, wherein the driving slide can drive the guide member at least along part of the path of movement of the closure element, wherein the open roof construction is of the spoiler type in which the closure element is moved from the closed position rearwardly above the fixed roof; and wherein during movements of the closure element, the curve part is fixed to the stationary part, and for opening the closure element the guide member is driven by the driving slide in order to displace it with respect to the first and second guide tracks to lift the rear side of the closure element, then the guide member is substantially locked to the stationary part, and a coupling between the driving slide and the guide member is released, while the driving slide is coupled to the closure element to drive the closure element with respect to the guide member.

* * * * *